No. 749,840. PATENTED JAN. 19, 1904.
S. BUTLER.
RIM FOR VEHICLE WHEELS.
APPLICATION FILED SEPT. 1, 1903.
NO MODEL. 2 SHEETS—SHEET 1.

Witnesses
G. E. Lederer
H. P. Hinkel

Inventor
Samuel Butler
by Walter Allen
Attorney

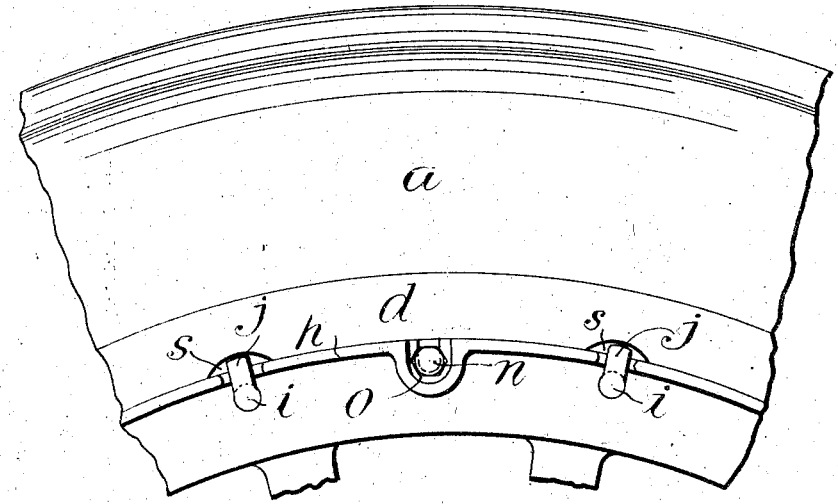
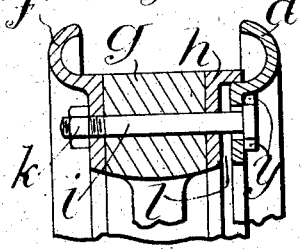
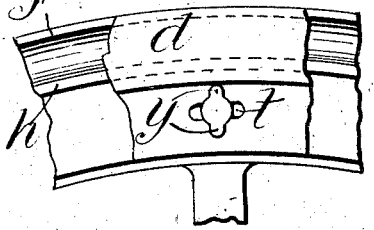
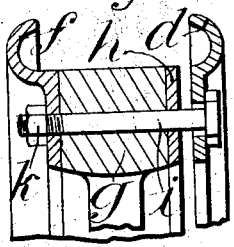
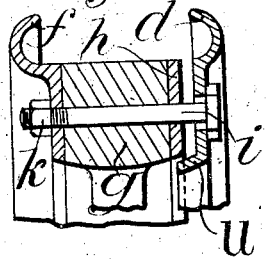
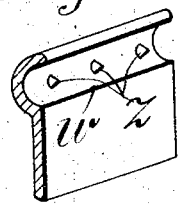

No. 749,840.

Patented January 19, 1904.

UNITED STATES PATENT OFFICE.

SAMUEL BUTLER, OF WESTBURY-UPON-TRYM, ENGLAND.

RIM FOR VEHICLE-WHEELS.

SPECIFICATION forming part of Letters Patent No. 749,840, dated January 19, 1904.

Application filed September 1, 1903. Serial No. 171,543. (No model.)

*To all whom it may concern:*

Be it known that I, SAMUEL BUTLER, merchant, a citizen of the United Kingdom of Great Britain and Ireland, and a resident of Henbury Hill, Westbury-upon-Trym, Bristol, England, have invented certain new and useful Improvements in and Connected with Rims and Tires for Motor-Cars and other Road-Vehicles, of which the following is a specification, such as will enable others skilled in the art to which it appertains to make and use the same.

My invention relates to improvements in and connected with the rims of wheels and elastic tires, more particularly pneumatic tires for the same.

The invention is specially designed for use upon motor-cars, but is applicable also to cycles, to carriages, and to other road-vehicles.

Most forms of pneumatic tires are very difficult to fix on the rims of the wheels. Those that grip themselves to the rim have enlarged edges which must be forced over a flange on the rim before they fall into their place between the flanges. Moreover, they are very liable to creep and break the inner or air tube. My invention overcomes these troubles, owing to the special rim and to the particular kind of tire which I use. My improved rim has two flanges, one of which is fixed and the other is removable and adjustable. When the removable flange is off the rim, the tire can be put onto the rim without trouble or force. One or more grooves or holes are formed in the rim, and in the case of wheels with fellies in the fellies also for the valve through which the tire is inflated. The inner or air tube can be put into the tire-cover before it is put onto the wheel, and the whole tire will slide easily into its place, care being necessary only to see that the valve is placed into the hole or slot. If desired, an elbow or bend can be attached to the valve, so that it will lead out at the side of the wheel, or the valve may be elbow-shaped. When the tire is in place on the rim, it must be pressed against the fixed flange. This is done by the removable flange, which fits over a metal ring fixed to the rim or felly of the wheel. When in position, the removable flange is forced against the tire and is fixed in the manner hereinafter described. The edges of the tire are made to abut or fit against each other and are sufficiently strong to take the pressure of the removable flange, which is held in position by bolts, screws, clips, or other suitable fittings. Projections may be formed on the flanges, or the engaging surfaces of the same may be roughened to more securely grip the tire and prevent it creeping. Several forms of bolts may be used to secure the removable flange in place, one of the most simple forms being an angle or L-head bolt. With this form of bolt a slot or hole is made in the metal ring, so that when the bolt is slackened the head can be turned and slipped off the removable flange and out of the slot in the metal ring, thus allowing the removable flange and the tire to be quickly removed. Any convenient number of bolts, screws, or the like may be used; but I preferably employ about six and use bolts with nuts which can be tightened with a spanner, so that the necessary pressure can be easily exerted on the removable flange. The edges of the tire may be strengthened by inserting wire, wire-gauze, or metal hoops or bands where the pressure is greatest, and the edges are enlarged, so as to afford a better grip for the flanges.

I will now describe my invention with reference to the accompanying drawings, in which—

Figure 1 is a transverse section of my improved rim and tire, taken on a line with a securing-bolt. Fig. 2 is a similar view of a rim and tire, taken on a line with the air-valve, showing a modification. Fig. 3 is a similar view of a tire, taken on a line with the air-valve, showing another modification. Fig. 4 is a side elevation of that shown in Fig. 1. Fig. 5 is a transverse section of a rim, taken on a line with a securing-bolt, showing another modification. Fig. 6 is a side elevation thereof, partly broken away. Fig. 7 is a transverse section of a rim, taken on a line with a securing-bolt, showing another modification. Fig. 8 is a similar view of a rim, taken on a line with a bolt, showing another modification. Fig. 9 is a detail showing a perspective view looking at the inner side of a retaining-flange, having tire-securing points or projections to prevent the creeping of the tire.

Referring to Fig. 1, I show a sectional view of a pneumatic tire $a$, with inner tube $b$ and formed with enlarged edges, which meet at $c$. The removable retaining-flange $d$ is forced by the bolt $i$, provided with L or angle head $j$, against one of the enlarged edges of the tire at $e$ and presses the tire tightly against the fixed retaining-flange $f$. The fixed metal ring $h$ is of angular section, having recesses for the heads of the bolts. The removable retaining-flange $d$ fits onto and surrounds the same, space $l$ being left between the removable retaining-flange and the rim or felly $g$ for adjustment. $k$ is the nut of the bolt $i$, which nut may be locked by cotter $x$ or by any other suitable means. The slots in the ring $h$ are sufficiently narrow to prevent the bolt-head turning unless the nut is slackened and the head removed from the slot. $v$ $v$ are wires inserted into the edges of the tire to strengthen the same.

Fig. 2 shows a sectional view of a pneumatic tire $a$ with inner tube $b$, to which is fitted elbow-valve $m$, terminating at $n$ on the side of the rim or felly $g$, in which hole or recess $o$ is formed for the valve. $f$ is the fixed flange, and $d$ the removable flange. $h$ is the metal ring. $v$ $v$ are strengthening-wires. In this case the metal ring $h$ is shown below the level of the rim $g$, and the flange $d$ fitting over it is free to slide inward without obstruction save the tire itself.

Fig. 3 shows a sectional view of a pneumatic tire $a$ of single-tube type, the joint between the edges of the tire being at $c$ on one side of the center, so as to allow the air-valve $m$ to make a good joint in a central position. $v$ $v$ are metal strengthening plates or bands.

Fig. 4 shows in side view part of the rim of a wheel with a pneumatic tire $a$ upon it. The removable flange $d$ is shown fitting over metal ring $h$, both of which are cut away or slotted at $s$ $s$ for the L-shaped heads of the bolts $i$. The end $n$ of the air-valve is shown in hole or recess $o$ at the side of the wheel.

Figs. 5 and 6 show, respectively, a sectional and a side elevation of a portion of a modified form of my improved rim and the bolt for fixing same. $g$ is the rim or felly, with fixed flange $f$, metal ring $h$, and removable flange $d$. $i$ is the bolt, with nut $k$. In this case the head of the bolt has two projecting lugs $y$ $y$, which can be passed through slot $t$, in the flange $d$. $l$ shows space left for adjustment. The metal ring $h$ is angle-shaped and acts as a guide for the flange $d$, which fits under the edges of the ring. By giving all the bolts $i$ a quarter-turn the flange $d$ can be removed.

Fig. 7 shows in section a form of rim similar to that shown in Fig. 5, but without the angular or guiding edge on the metal ring.

Fig. 8 shows in section a further modification of my improved rim. In this form the flange $d$ is constructed with a turned edge $u$, which fits under the metal ring $h$ and acts as a guide for the flange.

Fig. 9 shows in perspective part of a flange $w$, on which projections $z$ are formed for the purpose of gripping the tire.

Figure 1:
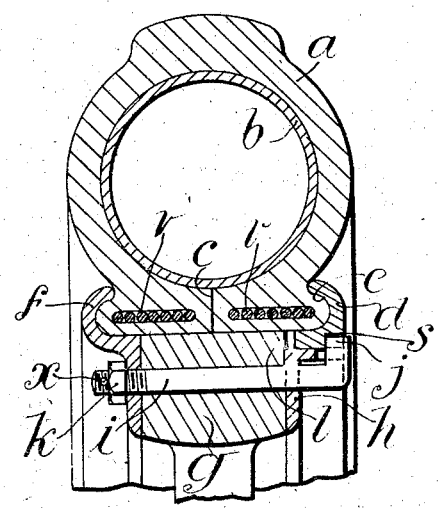
Figure 2:
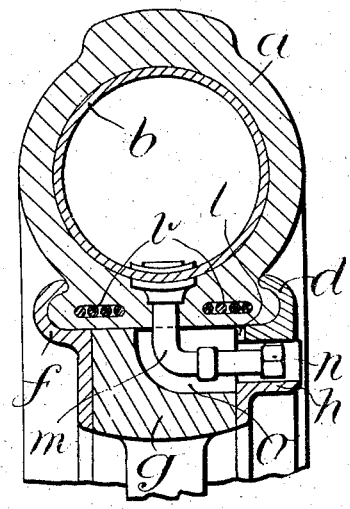
Figure 3:
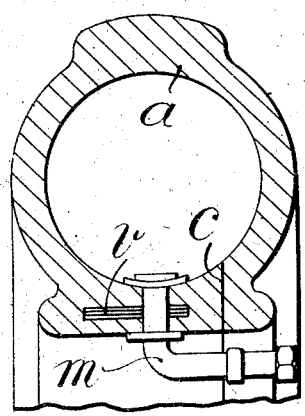

The patterns or shapes of the parts of my invention may vary, providing the essential features of it are not departed from, the shapes shown in the drawings being examples of some of many forms which the invention may take.

It will be seen that in my invention the whole of the grip or force of the removable flange is exerted by side pressure upon the edges of the tire.

The air-valves used with my improved tires may be straight or bent, as may be found most convenient; according to the shape and sizes of the rims or fellies of the wheel.

What I claim, and desire to secure by Letters Patent, is—

1. The combination, with a rim; of a fixed retaining-flange located on one side of the rim, a fixed ring located on the other side of the rim, a removable retaining-flange and bolts whereby the removable retaining-flange is secured to the fixed ring and rim.

2. The combination, with a rim; of a fixed retaining-flange located on one side of the rim, a fixed flanged ring located on the other side of the rim, a removable retaining-flange, and bolts whereby the removable retaining-flange is secured to the fixed ring and rim.

3. The combination, with a rim; of a fixed retaining-flange located on one side of the rim, a fixed ring having a flange formed with slots and located on the other side of the rim, a removable retaining-flange having recesses coinciding with the slots, and securing-bolts having heads adapted to engage in the said slots and recesses.

4. The combination of a rim having a recess, a fixed ring having an opening and a hollow tire provided with an air-valve extending through the recess of the rim and through the opening in the fixed ring.

In witness whereof I have hereunto set my hand in presence of two witnesses.

SAMUEL BUTLER.

Witnesses:
HENRY FAIRBROTHER,
GEO. J. B. FRANKLIN.